US012621892B2

(12) United States Patent
An

(10) Patent No.: US 12,621,892 B2
(45) Date of Patent: May 5, 2026

(54) USER TERMINAL DEVICE FOR PERFORMING EASY SETUP, CONTROL METHOD THEREOF AND HOME APPLIANCE

(71) Applicant: SAMSUNG ELECTRONICS CO., LTD., Suwon-si (KR)

(72) Inventor: Daesung An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 327 days.

(21) Appl. No.: 18/206,944

(22) Filed: Jun. 7, 2023

(65) Prior Publication Data

US 2024/0032126 A1 Jan. 25, 2024

Related U.S. Application Data

(63) Continuation of application No. PCT/KR2023/005320, filed on Apr. 19, 2023.

(30) Foreign Application Priority Data

Jul. 21, 2022 (KR) ........................ 10-2022-0090625

(51) Int. Cl.
H04W 76/18 (2018.01)
G16Y 40/40 (2020.01)
H04W 84/12 (2009.01)

(52) U.S. Cl.
CPC ............. *H04W 76/18* (2018.02); *G16Y 40/40* (2020.01); *H04W 84/12* (2013.01)

(58) Field of Classification Search
CPC ....... H04W 76/18; H04W 84/12; G16Y 40/40
See application file for complete search history.

(56) References Cited

U.S. PATENT DOCUMENTS 11,006,382 B2 5/2021 Chang et al.
11,452,159 B2 9/2022 Kim et al.
(Continued)

FOREIGN PATENT DOCUMENTS

JP 6944074 B1 10/2021
KR 10-2017-0053269 A 5/2017
(Continued)

OTHER PUBLICATIONS

International Search Report and Written Opinion (PCT/ISA/210 and PCT/ISA/237) dated: Jul. 24, 2023 issued by the International Searching Authority of International Application No. PCT/KR2023/005320.
(Continued)

*Primary Examiner* — Asad M Nawaz
*Assistant Examiner* — Hugh Mark Ashley
(74) *Attorney, Agent, or Firm* — Sughrue Mion, PLLC

(57) ABSTRACT

Provided is a user terminal device. The user terminal device includes a communication interface, a display, and a processor to control the user terminal device by being connected with the communication interface and the display, and the processor controls the communication interface to provide, to a home appliance operating through a soft access point, information about an access point, and based on joining failure information about the access point being received from the home appliance through the communication interface, control the display to display a screen guiding of joining failure based on the joining failure information.

20 Claims, 14 Drawing Sheets

(56) References Cited

U.S. PATENT DOCUMENTS

| | | | |
|---|---|---|---|
| 11,482,094 B2 | 10/2022 | Jung | |
| 11,943,834 B2 | 3/2024 | Kim et al. | |
| 2017/0134685 A1 | 5/2017 | Jung | |
| 2019/0132396 A1 | 5/2019 | Finnegan et al. | |
| 2020/0186604 A1 | 6/2020 | Park | |
| 2020/0275047 A1 | 8/2020 | Jung | |
| 2020/0305107 A1* | 9/2020 | Chang | H04W 76/14 |
| 2021/0153283 A1* | 5/2021 | Kim | H04W 60/00 |
| 2021/0168575 A1 | 6/2021 | Palin et al. | |
| 2022/0029848 A1* | 1/2022 | Ju | H04L 12/282 |
| 2022/0322062 A1 | 10/2022 | Kim et al. | |

FOREIGN PATENT DOCUMENTS

| | | | |
|---|---|---|---|
| KR | 10-2020-0112494 A | 10/2020 | |
| KR | 10-2021-0060111 A | 5/2021 | |
| KR | 10-2021-0121910 A | 10/2021 | |
| KR | 10-2326905 B1 | 11/2021 | |
| KR | 10-2021-0150151 A | 12/2021 | |
| KR | 10-2021-0154394 A | 12/2021 | |

OTHER PUBLICATIONS

MD. Shamsul Arifin Mozumder et al., "Cloud Push: Smart Delivery of Push Notification to Secure Multi-User Support for IoT Devices," 2020 IEEE International Conference on Cloud Engineering (IC2E), May 19, 2020 (10 total pages).

* cited by examiner

200

START

RECEIVE INFORMATION ABOUT ACCESS POINT FROM USER TERMINAL DEVICE BY OPERATING THROUGH SOFT ACCESS POINT ~S1310

TRANSMIT JOINING REQUEST TO ACCESS POINT BASED ON INFORMATION ABOUT ACCESS POINT ~S1320

TRANSMIT JOINING FAILURE INFORMATION ABOUT ACCESS POINT TO USER TERMINAL DEVICE WHEN JOINING WITH ACCESS POINT FAILS ~S1330

END

USER TERMINAL DEVICE FOR PERFORMING EASY SETUP, CONTROL METHOD THEREOF AND HOME APPLIANCE

CROSS-REFERENCE TO RELATED APPLICATIONS

This application is a continuation of PCT/KR2023/005320, filed on Apr. 19, 2023, at the Korean Intellectual Property Receiving Office and claims priority under 35 U.S.C. § 119 to Korean Patent Application No. 10-2022-0090625, filed on Jul. 21, 2022 at the Korean Intellectual Property Office, the disclosures of each which are incorporated by reference herein in their entireties.

BACKGROUND

1. Field

The disclosure relates to a user terminal device, a control method thereof, and a home appliance, and more particularly, to a user terminal device for communicating with an access point, a control method thereof, and a home appliance.

2. Description of Related Art

With recent technological advancements, electronic devices of various types are being developed to improve a user experience. In particular, recently, a user's convenience is improved with the increased use of internet of things (IoT) devices.

However, because many IoT devices are not included with displays, there may be difficulty transferring information to a user. Specifically, there may be a problem of it being difficult for the user to connect the IoT devices to an Internet.

The drawbacks described above may be solved through a smartphone. For example, connecting the IoT devices with the Internet and simultaneously registering the IoT devices in an IoT server may be possible through a method of arbitration using a smartphone. This method may be referred to as Easy Setup, onboarding, or commissioning.

SUMMARY

According to an aspect of the disclosure, a user terminal device includes: a communication interface; a display; and at least one processor configured to: control the user terminal device by being connected with the communication interface and the display, control the communication interface to provide, to a home appliance operating through a soft access point, information about an access point, and based on joining failure information about the access point being received through the communication interface, control the display to display a screen guiding of a joining failure based on the joining failure information.

The at least one processor may be further configured to, based on a reason for the joining failure being pre-set information, control the display to display a user interface (UI) for re-inputting the information about the access point.

The pre-set information may include at least one from among a service set identifier (SSID), a passphrase, or an encryption type.

The at least one processor may be further configured to control the communication interface to provide the joining failure information to an internet of things (IoT) server.

The communication interface may include: a first communication interface; and a second communication interface, wherein the at least one processor may be further configured to: control the first communication interface to form a communication channel according to a first communication standard with the home appliance, control the first communication interface to provide the information about the access point to the home appliance, control the second communication interface to scan a signal according to a second communication standard based on the communication channel according to the first communication standard being released, and based on the joining failure information being received from the home appliance through the second communication interface, control the display to display the screen guiding of the joining failure.

The at least one processor may be further configured to: control the communication interface to form the communication channel according to a pre-set communication standard with the home appliance, control the communication interface to provide information about the access point to the home appliance, control the communication interface to scan a signal according to the pre-set communication standard based on the communication channel according to the pre-set communication standard being released, control the communication interface to rejoin the communication channel according to the pre-set communication standard with the home appliance based on the signal according to the pre-set communication standard being scanned by the home appliance, and control the display to display the screen guiding of the joining failure.

The at least one processor may be further configured to, based on the joining failure information being received from the home appliance through the communication interface after rejoining the communication channel according to the pre-set communication standard with the home appliance, control the display to display the screen guiding of the joining failure.

The joining failure information may include at least one from among an error code, a Wi-Fi MAC address, or a product serial number.

According to an aspect of the disclosure, a home appliance includes: a communication interface; and at least one processor connected with the communication interface, the at least one processor configured to control the home appliance, wherein the at least one processor is further configured to: receive information about an access point from a user terminal device through the communication interface operating through a soft access point, control the communication interface to provide a joining request to the access point based on information about the access point, and control the communication interface to provide joining failure information about the access point to the user terminal device based on a failing of a joining with the access point.

The communication interface may include: a first communication interface; and a second communication interface, wherein the at least one processor may be further configured to control the first communication interface to form a communication channel according to a first communication standard with the user terminal device, release, based on information about the access point being received through the first communication interface, the communication channel with the user terminal device, and control the first communication interface to form the communication channel according to the first communication standard with the access point, and control the second communication interface to provide the joining failure information about the access point to the user terminal device based on the communication channel with the access point not being formed.

The at least one processor may be further configured to: control the communication interface to form the communication channel according to a pre-set communication standard with the user terminal device, based on information about the access point being received through the communication interface, release the communication channel with the user terminal device, and control the communication interface to form the communication channel according to the pre-set communication standard with the access point, and maintain a scannable state according to the pre-set communication standard based on the communication channel with the access point not being formed.

The at least one processor may be further configured to: receive a joining request from the user terminal device through the communication interface while maintaining the scannable state according to the pre-set communication standard, and based on the communication channel according to the pre-set communication standard being reformed with the user terminal device, control the communication interface to provide the joining failure information to the user terminal device.

According to an aspect of the disclosure, a control method includes: providing information about an access point to a home appliance operating through a soft access point; and based on joining failure information about the access point being received from the home appliance, displaying a screen guiding of a joining failure based on the joining failure information.

The displaying may include displaying, based on a reason for the joining failure being pre-set information, a user interface (UI) for re-inputting information about the access point.

The pre-set information may include at least one from among a service set identifier (SSID), a passphrase, or an encryption type.

According to an aspect of the disclosure, a user terminal device, may include: at least one memory configured to store instructions; at least one processor configured to execute the stored instructions: control a communication interface of the user terminal device to provide, to a home appliance, information about an access point, and based on receiving joining failure information through the communication interface, control a display to display a screen indicating occurrence of a joining failure based on the joining failure information.

The joining failure information may include at least one from among an error code, a MAC address, or a product serial number.

The at least one processor may be further configured to: control the communication interface to form a communication channel with the home appliance according to a communication standard; and control the communication interface to provide the information about the access point to the home appliance.

The at least one processor may be further configured to control the communication interface to scan a signal according to the communication standard based on the communication channel.

The communication standard may include at least one of a Wi-Fi communication standard and a Bluetooth communication standard.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
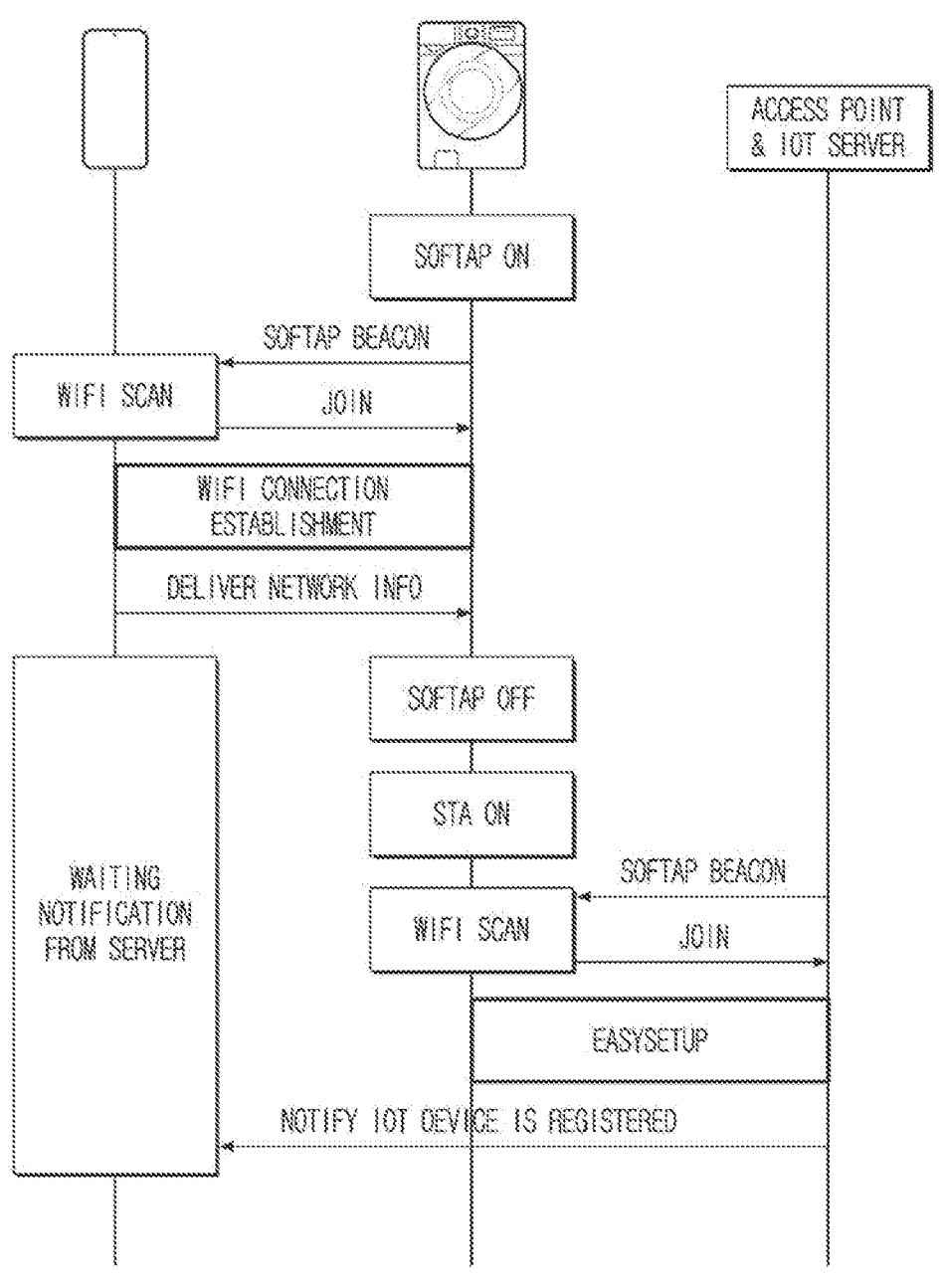
FIG. 1A and FIG. 1B are diagrams illustrating a problem that may occur at an Easy Setup in the related art.

The example embodiments of the disclosure will be described in detail below with reference to the accompanying drawings.

Embodiments of the disclosure may be diversely modified. Accordingly, embodiments are illustrated in the drawings and are described in detail in the detailed description. However, it is to be understood that the disclosure is not limited to a specific exemplary embodiment, but includes all modifications, equivalents, and substitutions without departing from the scope and spirit of the disclosure. Also, well-known functions or constructions are not described in detail since they would obscure the disclosure with unnecessary detail.

Aspects of the disclosure are to provide a user terminal device that minimizes user inconvenience based on failing an Easy Setup, a control method thereof, and a home appliance.

The disclosure will be described in detail below with reference to the accompanying drawings.

Terms used in describing the embodiments of the disclosure are general terms selected that are currently widely used considering their function herein. However, the terms may change depending on intention, legal or technical interpretation, emergence of new technologies, and the like, of those skilled in the related art. Further, in certain cases, there may be terms arbitrarily selected, and the meaning of the term will be disclosed in greater detail in the corresponding description. Accordingly, the terms used herein are not to be understood simply as its designation but based on the meaning of the term and the overall context of the disclosure.

In the disclosure, expressions such as "have," "may have," "include," "may include," or the like are used to designate a presence of a corresponding characteristic (e.g., elements such as numerical value, function, operation, or component), and not to preclude a presence or a possibility of additional characteristics.

Expressions such as "at least one of," when preceding a list of elements, modify the entire list of elements and do not modify the individual elements of the list. For example, the expressions, "at least one of a, b, and c," or "at least one of a, b, or c," should be understood as including only a, only b, only c, both a and b, both a and c, both b and c, or all of a, b, and c.

Expressions such as "first," "second," "1st," "2nd," and so on used herein may be used to refer to various elements regardless of order and/or importance. Further, it should be noted that the expressions are merely used to distinguish an element from another element and not to limit the relevant elements.

A singular expression includes a plural expression, unless otherwise specified. It is to be understood that the terms such as "form" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The term "user" may refer to a person using an electronic device or a device (e.g., artificial intelligence electronic device) using an electronic device.

The various embodiments of the disclosure will be described in greater detail below with reference to the accompanied drawings.

Figure 1B:
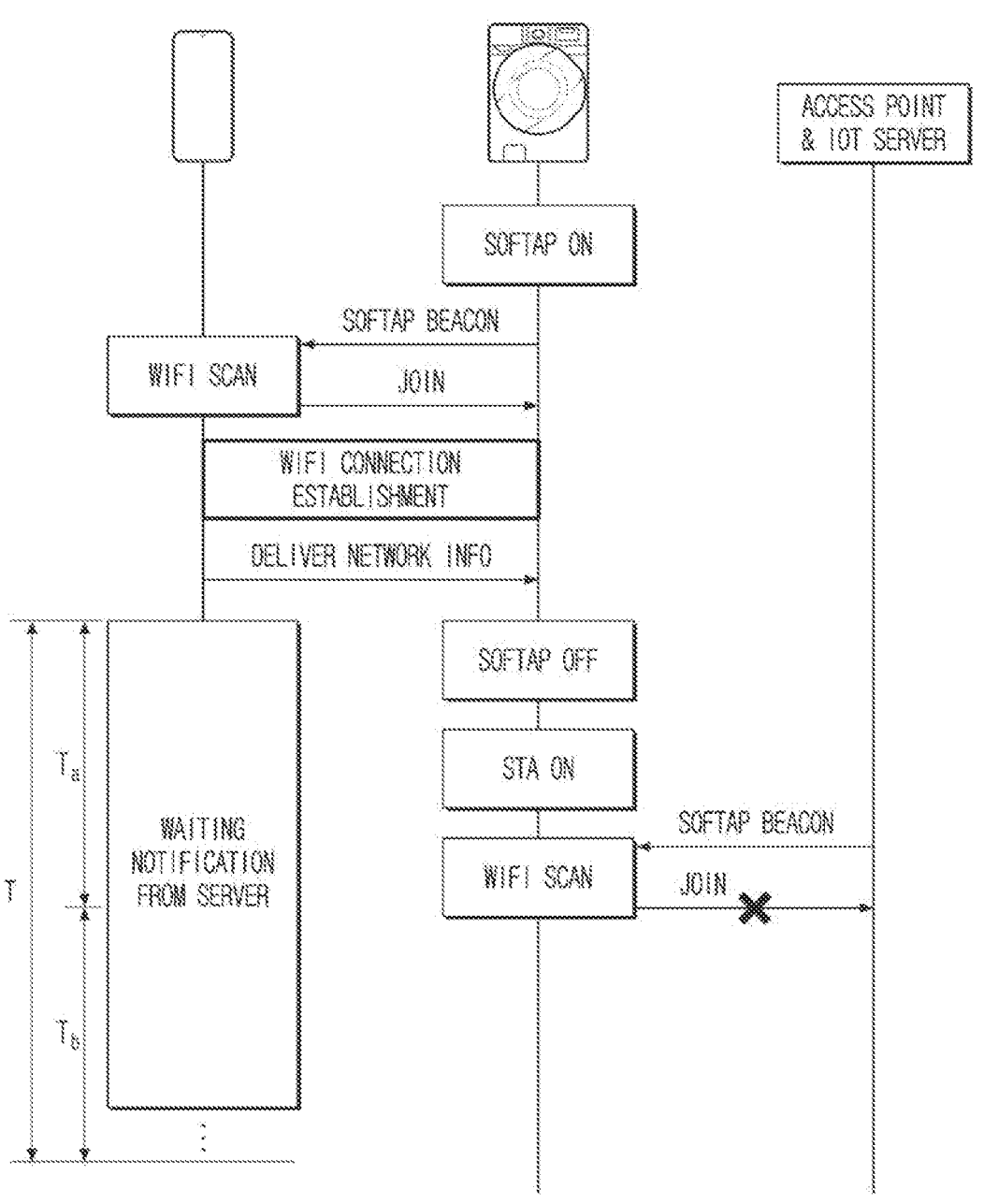

FIG. 1A and FIG. 1B are diagrams illustrating a problem that occurs at an Easy Setup in the related art.

A home appliance (e.g., an internet of things (IoT) device, shown as a washing machine in FIG. 1A) may be joined to an access point in an Easy Setup method using a software (Soft) access point (e.g., SoftAP) as shown in FIG. 1A. Specifically, the home appliance may automatically change a Wi-Fi state to a Soft access point state from an out of box (OOB) state, and transmit a beacon to a specific SSID. A smartphone of a user may scan the specific SSID, and form a device to device (D2D) communication channel between the smartphone and the home appliance by joining. The smartphone may transmit information (SSID of an access point, Passphrase, joining type, etc.) necessary in an onboarding to the home appliance through the D2D channel, and the home appliance may register a home appliance in an internet of things (IoT) server for not only joining the internet through Wi-Fi but also for an IoT service based on the received information.

That is, an Easy Setup technology of a Soft access point method may be divided into a D2D part that transmits necessary information from the smartphone to the IoT device when the smartphone and the IoT device form a joining and joins the access point, and a device to server (D2S) part that joins the IoT device to the access point and the IoT server based on the received information. The smartphone that completed D2D work may maintain a waiting state until D2S work of the IoT device is completed and a registration complete notification is received from the IoT server However, in the related art, when an IoT device is not registered to the access point or the IoT server for reasons such as a mismatch of access point information, weak radio wave signals, and the like, the smartphone may wait until a Timeout occurs for a predetermined time. For example, the smartphone may be waiting additionally for a time of Tb even after a time of Ta in which a result of D2S in FIG. 1B is derived. In addition, the smartphone may not receive a failure reason of D2S. Accordingly, there may be a problem of usability being decreased for the user as a waiting time is prolonged and the failure reason of D2S being unknown.

Figure 2:
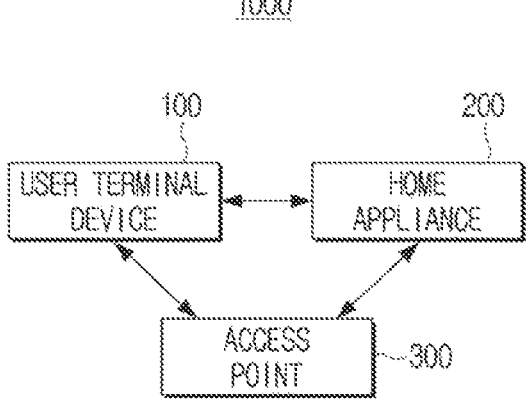
FIG. 2 is a block diagram illustrating a display system, according to an embodiment.

FIG. 2 is a block diagram illustrating an electronic system 1000, according to an embodiment. As shown in FIG. 2, an electronic system 1000 may include a user terminal device 100, a home appliance 200, and an access point 300.

The user terminal device 100 may include, as a device that performs Easy Setup, a display, and may be a device that supports the home appliance 200 to join the access point 300. For example, the user terminal device 100 may be a smartphone, a tablet personal computer (PC), a desktop PC, a notebook, a television (TV), and the like. However, the user terminal device 100 is not limited thereto.

The user terminal device 100 may display, based on joining failure information for the access point 300 being received from the home appliance 200, a screen guiding of a joining failure based on the joining failure information. The screen guiding of the joining failure may include information on a cause of the joining failure.

The home appliance 200 may be, as an IoT device, a device which is connected to the access point 300 by support of the user terminal device 100. For example, the home appliance 200 may be a washing machine, a refrigerator, a freezer, a washing machine, a robot cleaner, and the like.

The home appliance 200 may transmit, based on joining with respect to the access point 300 failing, joining failure information to the user terminal device 100. The joining failure information may include information on a reason for the joining failure.

Through the operations of the user terminal device 100 and the home appliance 200 as described above, user convenience may be improved due to the user identifying the joining failure and taking subsequent action.

The access point 300 may be a device that assists a device capable of wireless communication to join a network.

In FIG. 2, the home appliance 200 has been shown as being connected to the access point 300, but the home appliance 200 may be connected to the IoT server through the access point 300. However, the home appliance 200 has been described below as being connected to the access point 300, for convenience of description.

Figure 3:
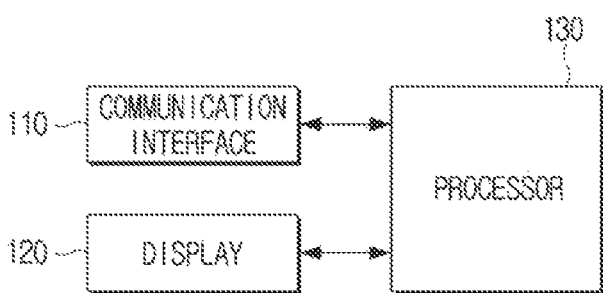
FIG. 3 is a block diagram illustrating a configuration of a user terminal device, according to an embodiment.

FIG. 3 is a block diagram illustrating a configuration of the user terminal device 100, according to an embodiment. Referring to FIG. 3, the user terminal device 100 may include a communication interface 110, a display 120, and a processor 130.

The communication interface 110 may be a configuration that performs communication with an external device of various types according to communication methods of various types. For example, the user terminal device 100 may perform communication with the home appliance 200 or the access point 300 through the communication interface 110.

The communication interface 110 may include a Wi-Fi module, a Bluetooth module, an infrared communication module, a wireless communication module, and the like. Each communication module may be implemented in at least one hardware chip form.

The Wi-Fi module and the Bluetooth module may perform communication in the Wi-Fi method and the Bluetooth method, respectively. When using the Wi-Fi module or the Bluetooth module, various joining information such as a service set identifier (SSID) and a session key may first be transmitted and received, and after communicatively joining using the same, various information may be transmitted and received. The infrared communication module may perform communication according to an infrared communication (Infrared Data Association (IrDA)) technology of transmitting data wirelessly in short range by using infrared rays present between visible rays and millimeter waves.

The wireless communication module may include at least one communication chip that performs communication according to various wireless communication standards such as, for example, and without limitation, ZigBee, 3rd Generation (3G), 3rd Generation Partnership Project (3GPP), Long Term Evolution (LTE), LTE Advanced (LTE-A), 4th Generation (4G), 5th Generation (5G), and the like, in addition to the above-described communication methods.

Alternatively, the communication interface 110 may include wired communication interfaces such as, for example, and without limitation, HDMI, DP, Thunderbolt, USB, RGB, D-SUB, DVI, and the like.

In addition thereto, the communication interface 110 may include at least one from among the wired communication modules that perform communication using a local area network (LAN) module, an Ethernet module, or a pair cable, a coaxial cable, an optical fiber cable, or the like.

The display 120 may be a configuration that displays an image, and implemented as a display of various forms such as a liquid crystal display (LCD), an organic light emitting diode (OLED) display, and a plasma display panel (PDP). In the display 120, a driving circuit, which may be implemented in the form of an a-si TFT, a low temperature poly silicon (LTPS) TFT, an organic TFT (OTFT), or the like, a backlight unit, and the like, may be included. The display 120 may be implemented as a touch screen coupled with a touch sensor, a flexible display, a three-dimensional display (3D display), or the like.

The processor 130 may control the overall operation of the user terminal device 100. Specifically, the processor 130 may control the overall operation of the user terminal device 100 by being joined with each configuration of the user terminal device 100. For example, the processor 130 may be joined with configurations such as the communication interface 110, the display 120, and a memory, and control an operation of the user terminal device 100.

According to an embodiment, the processor 130 may be implemented as a digital signal processor (DSP), a microprocessor, or a time controller (TCON). However, the embodiment is not limited thereto, and may include one or more from among a central processing unit (CPU), a micro controller unit (MCU), a micro processing unit (MPU), a controller, an application processor (AP), a communication processor (CP), or an ARM processor, or may be defined by the corresponding term. In addition, the processor 130 may be implemented as a System on Chip (SoC) or a large scale integration (LSI) embedded with a processing algorithm, and may be implemented in the form of a field programmable gate array (FPGA).

The processor 130 may be implemented as one processor or as a plurality of processors. For convenience of description, an operation of the user terminal device 100 will be described below using the term processor 130.

The processor 130 may control the communication interface 110 to transmit information about the access point 300 to the home appliance 200 that operates through the Soft access point.

For example, the processor 130 may control, based on the home appliance 200 operating through the Soft access point and a communication channel being formed between the user terminal device 100 and the home appliance 200, the communication interface 110 to transmit information about the access point 300 to the home appliance 200.

Then, if the home appliance 200 is joined to the access point 300, the user terminal device 100 may receive information that the home appliance 200 is joined to the access point 300 from the access point 300.

Alternatively, if the home appliance 200 is not joined to the access point 300, the processor 130 may receive the joining failure information about the access point 300 from the home appliance 200 through the communication interface 110. The joining failure information may include at least one from among an error code, a Wi-Fi MAC address, or a product serial number.

The processor 130 may control, based on the joining failure information being received, the display 120 to display a screen guiding of the joining failure based on the joining failure information.

The processor 130 may control, based on the reason for joining failure being a pre-set information based on the joining failure information, the display 120 to display a user interface (UI) for re-inputting information about the access point 300. The pre-set information may include at least one from among a service set identifier (SSID), a Passphrase, or an encrypt type. That is, the processor 130 may not return to an initial process of Easy Setup when the reason for joining failure is the pre-set information, and usability may be increased by displaying the UI for re-inputting information about the access point 300.

The processor 130 may control the communication interface 110 to transmit the joining failure information to the IoT server. For example, the processor 130 may control the communication interface 110 to transmit the joining failure information to the IoT server through the access point 300. Through such operation, the reason for joining failure may be analyzed hereafter.

The operation as described above may be operated through at least one communication standard, or operated through a plurality of communication standards. First, a method of using the plurality of communication standards will be described.

The communication interface 110 may include a first communication interface and a second communication interface, and the processor 130 may control the first communication interface to form a communication channel according to a first communication standard with the home appliance 200, control the first communication interface to transmit information about the access point 300 to the home appliance 200, control the second communication interface to scan a signal according to a second communication standard when the communication channel according to the first communication standard is released, and control, based on the joining failure information being received from the home appliance 200 through the second communication interface, the display 120 to display a screen guiding of the joining failure. The first communication standard may be the Wi-Fi method, and the second communication standard may be the Bluetooth method.

Alternatively, the processor 130 may control the communication interface 110 to form a communication channel according to a pre-set communication standard with the home appliance 200, control the communication interface 110 to transmit information about the access point 300 to the home appliance 200, control the communication interface 110 to scan a signal according to the pre-set communication standard when the communication channel according to the pre-set communication standard is released, control the communication interface 110 to rejoin the communication channel according to the pre-set communication standard with the home appliance 200 when the signal according to the pre-set communication signal is scanned by the home appliance 200, and control the display 120 to display a screen guiding of the joining failure. The pre-set communication standard may be the Wi-Fi method.

The processor 130 may control, based on the joining failure information being received from the home appliance 200 through the communication interface 110 after rejoining the communication channel according to the pre-set communication standard with the home appliance 200, the display 120 to display a screen guiding of the joining failure.

However, embodiments are not limited thereto, and the processor 130 may identify, based on the communication channel according to the pre-set communication standard being rejoined with the home appliance 200 even before the joining failure information is received from the home appliance 200, as the home appliance 200 having failed in joining the access point 300 and control the display 120 to display a screen guiding of the joining failure.

Figure 4:
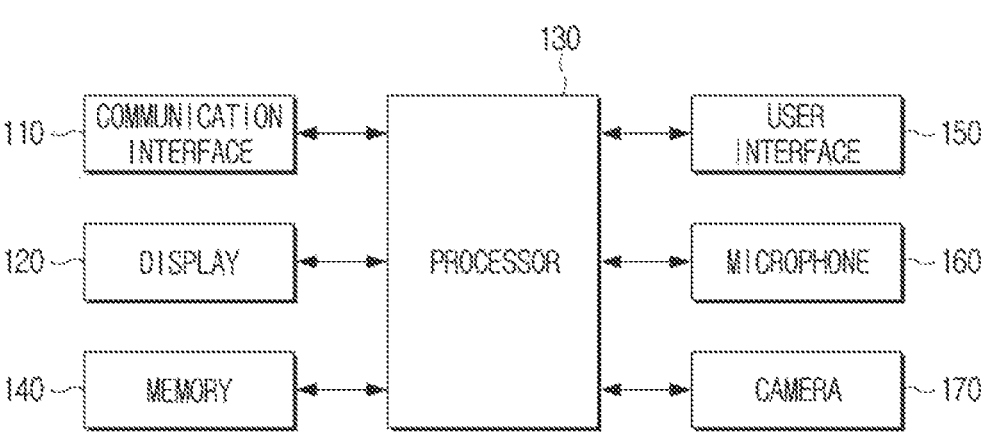
FIG. 4 is a block diagram illustrating a detailed configuration of a user terminal device, according to an embodiment.

FIG. 4 is a block diagram illustrating a detailed configuration of the user terminal device 100, according to an embodiment. The user terminal device 100 may include the communication interface 110, the display 120, and the processor 130. In addition, referring to FIG. 4, the user terminal device 100 may further include a memory 140, a user interface 150, a microphone 160, and a camera 170. Detailed descriptions on parts that overlap with the elements shown in FIG. 3 from among the elements shown in FIG. 4 will be omitted.

The memory 140 may refer to a hardware that stores information such as data in electric or magnetic form for the processor 130, and the like, to access. To this end, the memory 140 may be implemented as at least one hardware from among a non-volatile memory, a volatile memory, a flash memory, a hard disk drive (HDD) or a solid state drive (SSD), a random access memory (RAM), a read only memory (ROM), and the like.

In the memory 140, at least one instruction necessary in an operation of the user terminal device 100 or the processor 130 may be stored. The instruction may be a code unit that instructs an operation of the user terminal device 100 or the processor 130, and may be prepared in a machine language which is a language that can be understood by a computer. Alternatively, the memory 140 may be stored in a plurality of instructions that perform a specific work of the user terminal device 100 or the processor 130 as an instruction set.

The memory 140 may be stored with data which is information in a bit or byte unit that can represent a character, a number, an image, and the like. For example, the memory 140 may be stored with information about the access point 300, and the like.

The memory 140 may be accessed by the processor 130 and reading, writing, modifying, deleting, updating, and the like, of the instruction, the instruction set, or data may be performed by the processor 130.

The user interface 150 may be implemented as a button, a touch pad, a mouse, a keyboard, and the like, or implemented also as a touch screen capable of performing a display function and an operation input function together therewith. The button may be a button of various types such as a mechanical button, a touch pad, or a wheel which is formed at a random area at a front surface part or a side surface part, a rear surface part, or the like of an exterior of a main body of the user terminal device 100.

The microphone 160 may be a configuration for receiving sound and converting to an audio signal. The microphone 160 may be electrically connected to the processor 130, and may receive sound by the control of the processor 130.

For example, the microphone 160 may be formed as an integrated-type integrated to an upper side or a front surface direction, a side surface direction or the like of the user terminal device 100. The microphone 160 may also be provided in a separate remote controller, or the like, from the user terminal device 100. The remote controller may receive sound through the microphone 160, and provide the received sound to the user terminal device 100.

The microphone 160 may include various configurations such as a microphone that collects sound of an analog form, an amplifier circuit that amplifies the collected sound, an A/D converter circuit that samples the amplified sound and converts to a digital signal, a filter circuit that removes noise components from the converted digital signal, and the like.

The microphone 160 may be implemented in a form of a sound sensor, and may be any method so long as it is a configuration that can collect sound.

In addition thereto, the user terminal device 100 may further include the camera 170. The camera 170 may be a configuration for capturing a still image or a moving image. The camera 170 may capture a still image from a specific time-point, but may also capture still images consecutively.

The camera 170 may include a lens, a shutter, an aperture, a solid-state imaging device, an analog front end (AFE), and a timing generator (TG). The shutter may adjust time of which light reflected from a subject enters the camera 170, and the aperture may adjust an amount of light incident to the lens by mechanically increasing or decreasing a size of an opening part through which light enters. The solid-state imaging device may output, based on light reflected from the subject being accumulated as photoelectric charges, an image by a photoelectric charge and output as an electric signal. The TG may output a timing signal for leading out pixel data of the solid-state imaging device, and the AFE may sample the electric signal that is output from the solid-state imaging device and digitalizes the same.

The user terminal device 100 as described above may raise, based on the joining failure information about the access point 300 being received from the home appliance 200 in an Easy Setup process of the home appliance 200, user convenience by displaying a screen guiding of the joining failure, and reduce an Easy Setup time by displaying the UI for re-inputting information about the access point 300 when the reason for joining failure is a pre-set reason.

Figure 5:
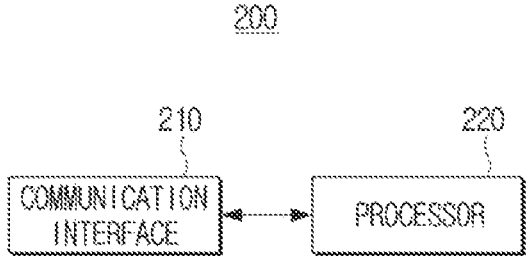
FIG. 5 is a block diagram illustrating a configuration of a home appliance, according to an embodiment.

FIG. 5 is a block diagram illustrating a configuration of the home appliance 200, according to an embodiment. Referring to FIG. 5, the home appliance 200 may include a communication interface 210 and a processor 220.

The communication interface 210 may be a configuration that performs communication with an external device of various types according to communication methods of various types. For example, the home appliance 200 may perform communication with the user terminal device 100 or the access point 300 through the communication interface 210.

The communication interface 210 may include the Wi-Fi module, the Bluetooth module, the infrared communication module, the wireless communication module, and the like. Here, each communication module may be implemented in at least one hardware chip form.

The Wi-Fi module and the Bluetooth module may perform communication in the Wi-Fi method and the Bluetooth method, respectively. When using the Wi-Fi module or the Bluetooth module, various joining information such as the service set identifier (SSID) and the session key may first be transmitted and received, and after communicatively joining using the same, various information may be transmitted and received. The infrared communication module may perform communication according to the infrared communication (Infrared Data Association (IrDA)) technology of transmitting data wirelessly in short range by using infrared rays present between visible rays and millimeter waves.

The wireless communication module may include at least one communication chip that performs communication according to various wireless communication standards such as, for example, and without limitation, ZigBee, 3rd Generation (3G), 3rd Generation Partnership Project (3GPP), Long Term Evolution (LTE), LTE Advanced (LTE-A), 4th Generation (4G), 5th Generation (5G), and the like, in addition to the above-described communication methods.

Alternatively, the communication interface 210 may include wired communication interfaces such as, for example, and without limitation, HDMI, DP, Thunderbolt, USB, RGB, D-SUB, DVI, and the like.

In addition thereto, the communication interface 210 may include at least one from among the wired communication modules that perform communication using the local area network (LAN) module, the Ethernet module, or the pair cable, the coaxial cable, the optical fiber cable, or the like.

The processor 220 may control the overall operation of the home appliance 200. Specifically, the processor 220 may control the overall operation of the home appliance 200 by being joined with each configuration of the home appliance 200. For example, the processor 220 may be joined with configurations such as the communication interface 210, and a memory and control an operation of the home appliance 200.

According to an embodiment, the processor 220 may be implemented as the digital signal processor (DSP), the microprocessor, or the time controller (TCON). However, the embodiment is not limited thereto, and may include one or more from among the central processing unit (CPU), the micro controller unit (MCU), the micro processing unit (MPU), the controller, the application processor (AP), the communication processor (CP), or the ARM processor, or may be defined by the corresponding term. In addition, the processor 220 may be implemented as the System on Chip (SoC) or the large scale integration (LSI) embedded with the processing algorithm, and may be implemented in the form of the field programmable gate array (FPGA).

The processor 220 may be implemented as one processor or as a plurality of processors. However, for convenience of description, an operation of the home appliance 200 will be described below using the expression processor 220.

The processor 220 may receive information about the access point 300 from the user terminal device 100 through the communication interface 210 by operating through the Soft access point, control the communication interface 210 to transmit a joining request to the access point 300 based on information about the access point 300, and control the communication interface 210 to transmit the joining failure information about the access point 300 to the user terminal device 100 when joining with the access point 300 fails.

The communication interface 210 may include a first communication interface and a second communication interface, and the processor 220 may control the first communication interface to form a communication channel according to the first communication standard with the user terminal device 100, release, based on information about the access point 300 being received through the first communication interface, the communication channel with the user terminal device 100, control the first communication interface to form a communication channel according to the first communication standard with the access point 300, and control the second communication interface to transmit the joining failure information about the access point 300 to the user terminal device 100 if the communication channel with the access point 300 is not formed.

Alternatively, the processor 220 may control the communication interface 210 to form a communication channel according to the pre-set communication standard with the user terminal device 100, release, based on the information about the access point 300 being received through the communication interface 210, the communication channel with the user terminal device 100, control the communication interface 210 to form a communication channel according to the pre-set communication standard with the access point 300, and maintain a scannable state according to the pre-set communication standard if the communication channel with the access point is not formed.

The processor 220 may receive the joining request from the user terminal device 100 through the communication interface 210 while maintaining the scannable state according to the pre-set communication standard, and control, based on the communication channel according to the pre-set communication standard being reformed with the user terminal device 100, the communication interface 210 to transmit the joining failure information to the user terminal device 100.

The home appliance 200 as described above may reduce, based on joining of the access point 300 failing in the Easy Setup process, waiting time for rejoining by transmitting the joining failure information to the user terminal device 100.

An operation of the user terminal device 100 and the home appliance 200 will be described in greater detail below with FIG. 6 to FIG. 11. In FIG. 6 to FIG. 11, with separate embodiments being described for convenience of description. However, according to one or more embodiments, the separate embodiments of FIG. 6 to FIG. 11 may be realized in a combined state.

Figure 6:
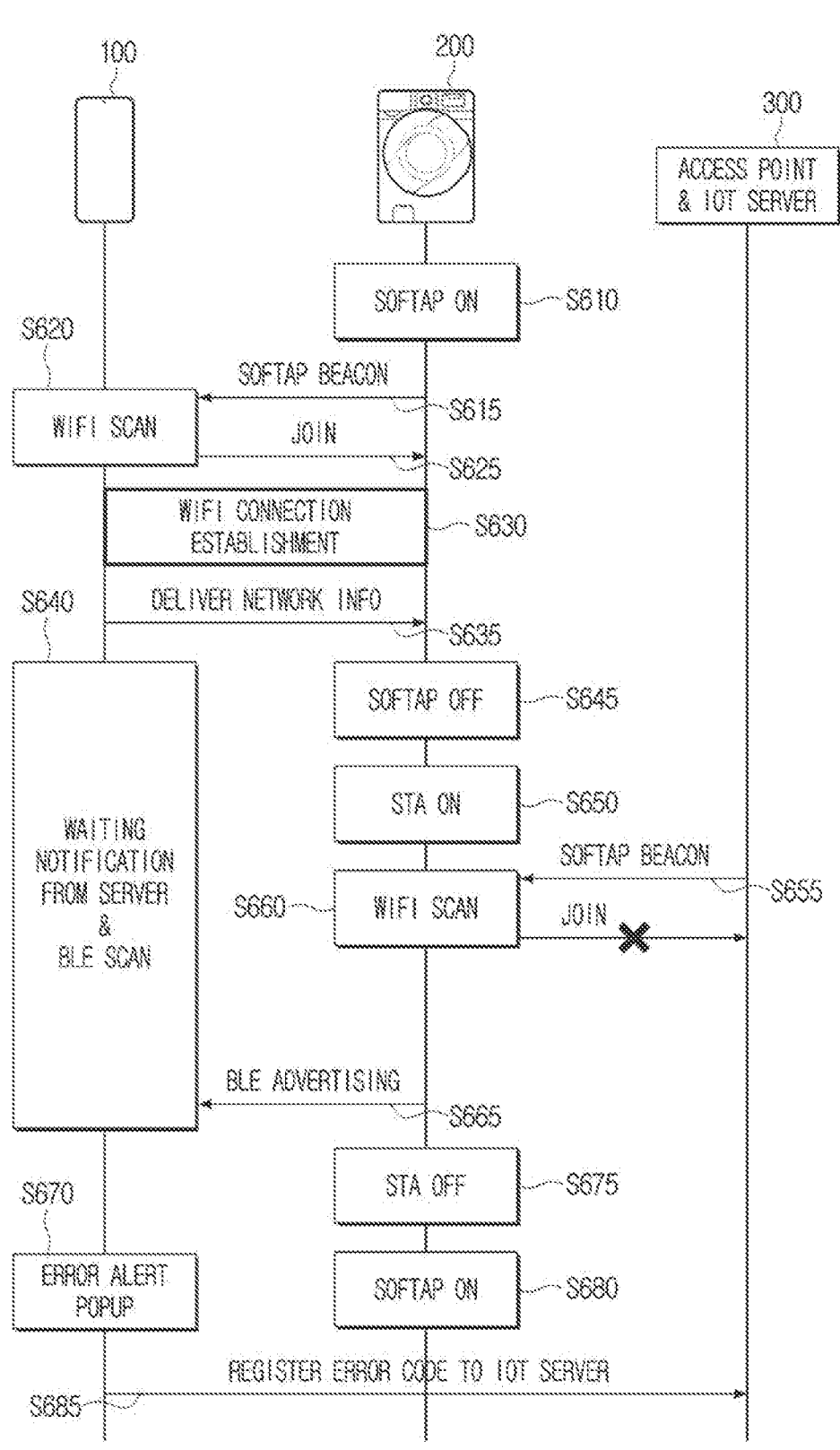
FIG. 6 is a sequence diagram illustrating an operation of a user terminal device and a home appliance, according to an embodiment.

FIG. 6 is a sequence diagram illustrating an operation of the user terminal device 100 and the home appliance 200, according to an embodiment.

First, the home appliance 200 may turn on the Soft access point (S610), and transmit a Beacon signal (S615).

The user terminal device 100 may receive the Beacon signal of the home appliance 200 through a Wi-Fi Scan (S620), and join as the home appliance 200 that operates as the Soft access point (S625).

When the home appliance 200 allows the joining request of the user terminal device 100, the user terminal device 100 and the home appliance 200 may form a communication channel that can directly communicate in Wi-Fi (D2D) (S630).

The user terminal device 100 may transmit, based on a communication channel being formed with the home appliance 200, information about the access point 300 to the home appliance 200 (S635). Alternatively, the user terminal device 100 may transmit, based on a communication channel being formed with the home appliance 200, information about the access point 300 and information about the IoT server to the home appliance 200.

The user terminal device 100 may wait to receive the registration complete notification for the IoT server of the home appliance 200 from the access point 300 after transmitting information to the home appliance. For example, the user terminal device 100 may display, after transmitting information to the home appliance 200, a standby screen and scan a Bluetooth signal (S640). The registration complete notification may be information that the IoT server transmits to the user terminal device 100 through the access point 300.

The home appliance 200 may turn off, based on information being received from the user terminal device 100, the Soft access point (S645), and turn on a standby mode (S650). The home appliance 200 may receive the Beacon signal of the access point 300 (S655) through the Wi-Fi Scan (S660), and attempt D2S joining and product registration in the IoT server.

The home appliance 200 may broadcast (S665) through BLE advertising a packet that contains product information and the error code when D2S joining fails for reasons of a mismatch of information about the access point 300, a weak signal intensity, power being off of the access point 300, and the like. The BLE advertising packet may further include a Wi-Fi MAC address, a serial number, and the like, that can specify the home appliance 200.

The user terminal device 100 may display, based on the BLE advertising packet being received from the home appliance 200, a screen guiding of the joining failure (S670). For example, the user terminal device 100 may identify, based on the BLE Advertising packet being received from the home appliance 200, whether it is the home appliance 200 that attempted joining previously based on the Wi-Fi MAC address, the serial number, and the like, included in the packet, and end the standby screen and display a screen guiding of the joining failure. The screen guiding of the joining failure may include information about an error reason.

The home appliance 200 may turn off, after broadcasting the BLE advertising packet, the standby mode (S675) and turn on the Soft access point (S680), and maintain a state for re-performing Easy Setup.

The user terminal device 100 may transmit the joining failure information to the IoT server (S685). The joining failure information may include at least one from among the error code, the Wi-Fi MAC address, or the product serial number.

Figure 7:
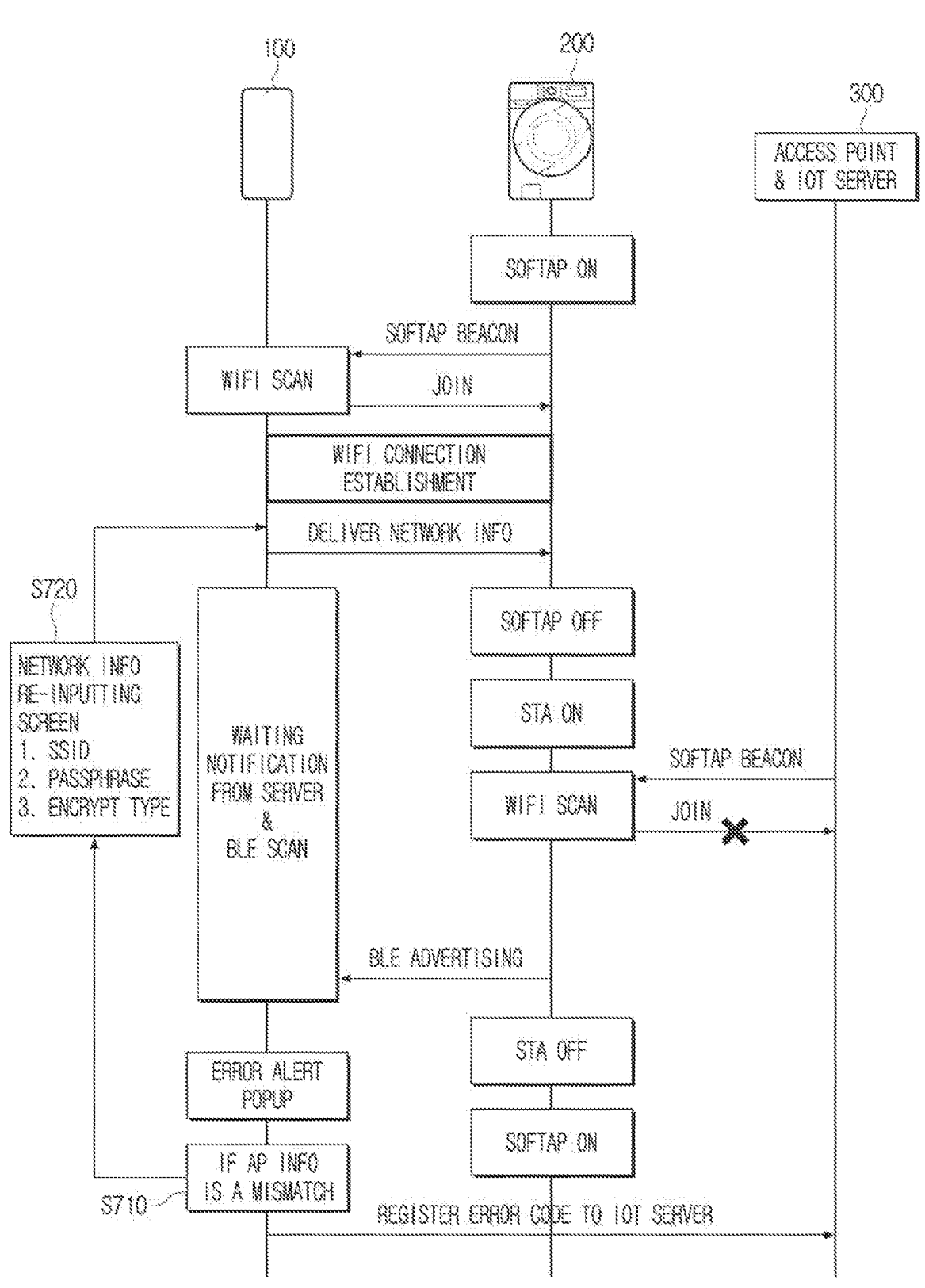
FIG. 7 is a sequence diagram illustrating an operation after a joining failure according to an embodiment.

FIG. 7 is a sequence diagram illustrating an operation after a joining failure, according to an embodiment. In FIG. 7, because the operation of the user terminal device 100 displaying a screen guiding of the joining failure is the same as in FIG. 6, only added operations will be described with respect to FIG. 7.

The user terminal device 100 may display, based on the reason for joining failure being pre-set information such as the SSID, the Passphrase, and the encryption type (S710) after the screen guiding of the joining failure is displayed, the UI for re-inputting information about the access point 300 (S720). The UI for re-inputting the information about the access point 300 may be a UI for re-inputting the SSID, the Passphrase, the encryption type, and the like.

That is, the user terminal device 100 may not return to an initial process of Easy Setup, and may increase usability by displaying the UI for re-inputting the information about the access point 300.

However, the embodiment is not limited thereto, and the user terminal device 100 may store past joining history information. The user terminal device 100 may transmit information about the access point that corresponds to the reason for joining failure to the home appliance 200 based on the joining history information. Thus, an inconvenience of the user having to re-input the information about the access point 300 may be resolved.

Figure 8:
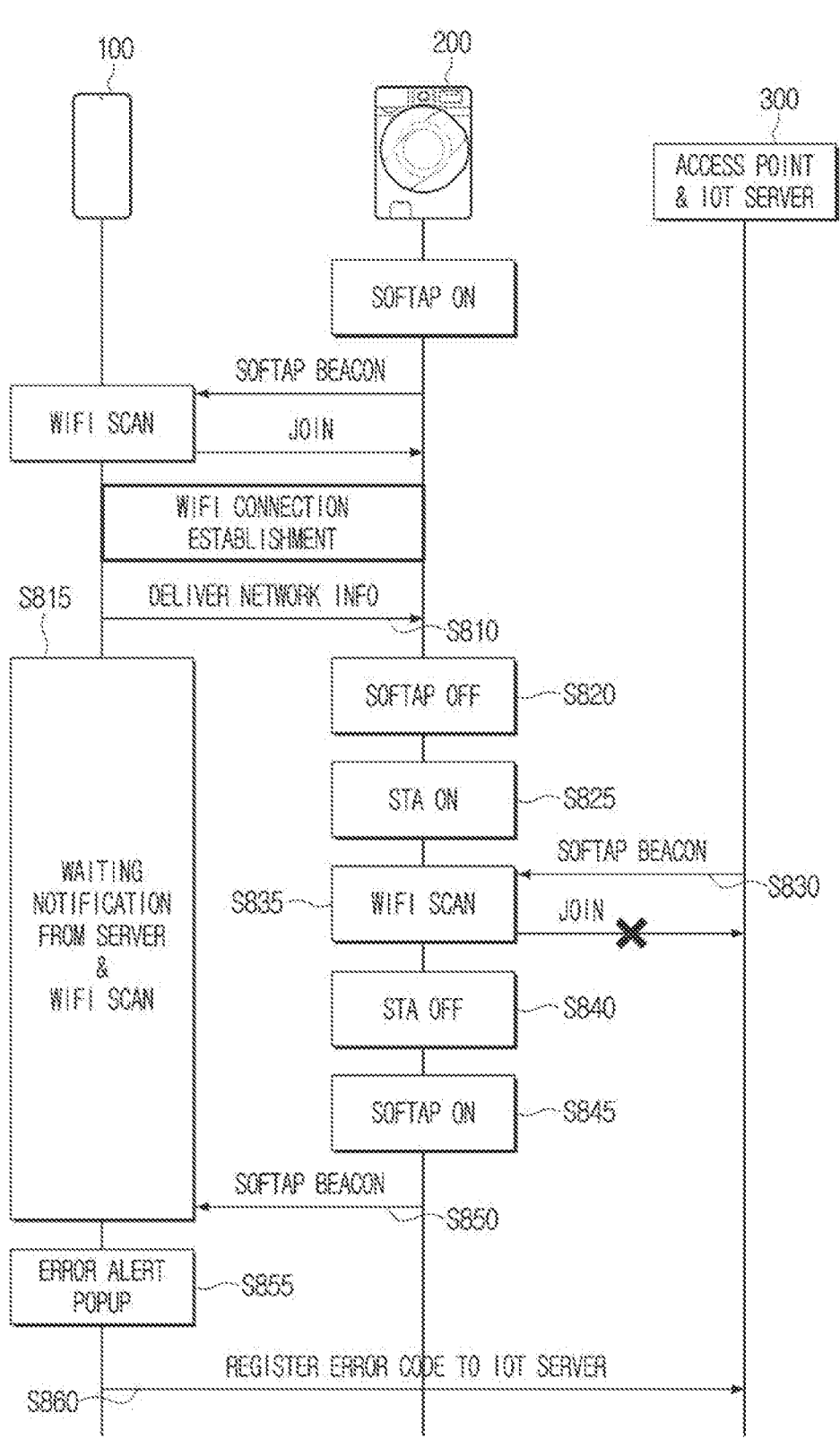
FIG. 8 is a sequence diagram illustrating an operation of a user terminal device and a home appliance, according to an embodiment.

FIG. 8 is a sequence diagram illustrating an operation of a user terminal device and a home appliance, according to an embodiment. FIG. 6 and FIG. 7 described of using a Wi-Fi communication standard and a Bluetooth communication standard, but the embodiment is not limited thereto, and only the Wi-Fi communication standard may be used. In FIG. 8, parts that operate differently from FIG. 6 will be mainly described.

The user terminal device 100 may transmit, based on the communication channel according to the Wi-Fi communication standard being formed with the home appliance 200, information about the access point 300 to the home appliance 200 (S810). Alternatively, the user terminal device 100 may transmit, based on the communication channel according to the Wi-Fi communication standard being formed with the home appliance 200, information about the access point 300 and information about the IoT server to the home appliance 200.

The user terminal device 100 may wait, after transferring information to the home appliance 200, to receive the registration complete notification for the IoT server of the home appliance 200 from the access point 300. For example, the user terminal device 100 may display, after transmitting information to the home appliance 200, the standby screen and scan the Wi-Fi signal (S815). The registration complete notification may be information that the IoT server transmits to the user terminal device 100 through the access point 300.

The home appliance 200 may turn off, based on information being received from the user terminal device 100, the Soft access point (S820), and turn on the standby mode (S825). The home appliance 200 may receive the Beacon signal of the access point 300 (S830) through the Wi-Fi Scan (S835), and attempt D2S joining and product registration in the IoT server.

The home appliance 200 may turn off, based on D2S joining failing for reasons of a mismatch of information about the access point 300, a weak signal intensity, power being off of the access point 300, and the like, the standby mode (S840), and turn on the Soft access point (S845) and transmit the Beacon signal (S850).

The user terminal device 100 may identify, based on the Beacon signal of the home appliance 200 being received through the Wi-Fi Scan (S815), as the home appliance 200 having failed in joining the access point 300, and display a screen guiding of the joining failure (S855).

However, the embodiment is not limited thereto, and the user terminal device 100 may form, based on the Beacon signal of the home appliance 200 being received through the Wi-Fi Scan (S815), a communication channel according to the Wi-Fi communication standard with the home appliance 200, and receive the joining failure information from the home appliance 200. The user terminal device 100 may display a screen guiding of the joining failure based on the joining failure information.

The user terminal device 100 may transmit the joining failure information to the IoT server (S860). The joining failure information may include at least one from among the error code, the Wi-Fi MAC address, or the product serial number.

In FIG. 6 to FIG. 8, identifying the joining failure with the Bluetooth communication standard or the Wi-Fi communication standard has been illustrated, but embodiments are not limited thereto. For example, the home appliance 200 may transmit the joining failure information to the user terminal device 100 through various communication methods such as, for example, and without limitation, NFC, ZigBee, and the like.

Alternatively, the user terminal device 100 may transmit the information about the access point 300 to the home appliance 200 and additionally transmit information about available communication standards to the home appliance 200. The home appliance 200 may operate, if having failed in the joining of the access point, as in FIG. 6 or FIG. 8 based on the information on the available communication standards or transmit the joining failure information to the user terminal device 100 through other communication standards.

A user of the related art had to wait by about time T in FIG. 1B in case of joining failure, but the user may check, through the operation as described above, whether there is joining failure by time Ta. That is, the user may save unnecessary waiting time Tb than the related art. In addition, because the user may be able to check the reason for joining failure, a more active handling may be possible.

Figure 9:
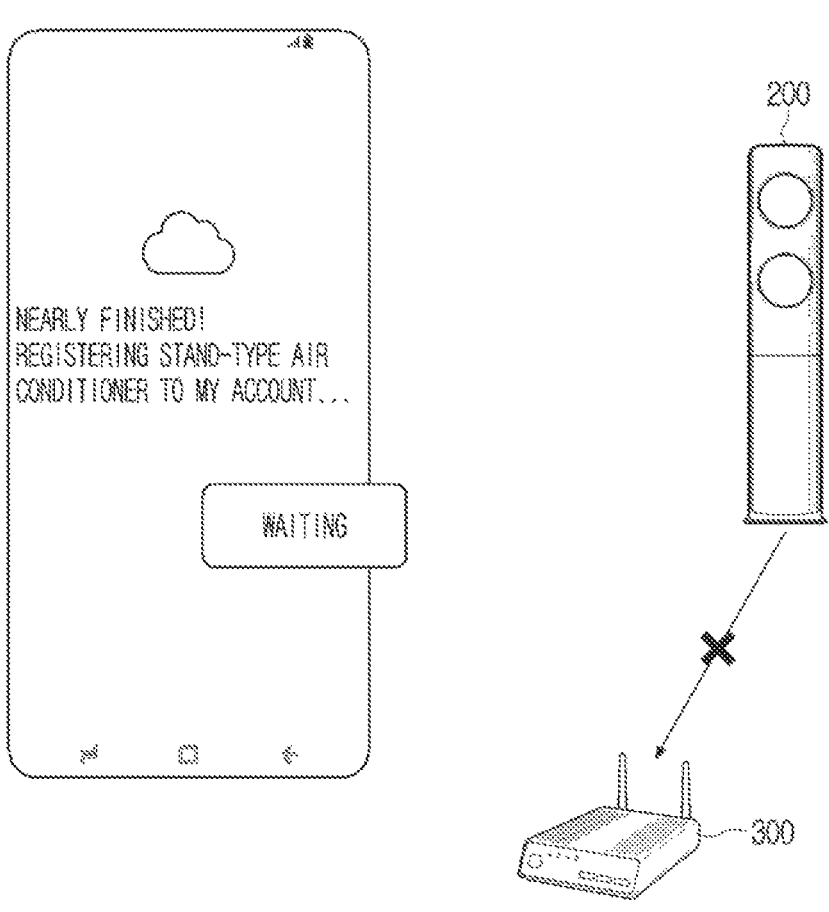
FIGS. 9 to 11 are diagrams illustrating an operation of guiding a joining failure, according to one or more embodiments.
Figure 10:
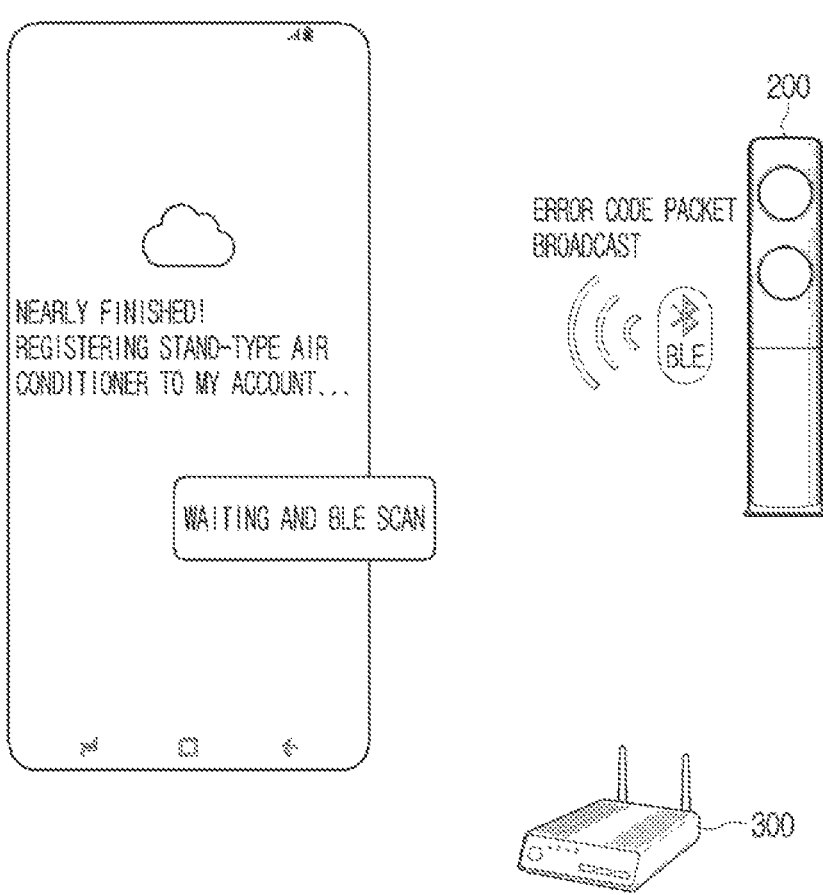
Figure 11:
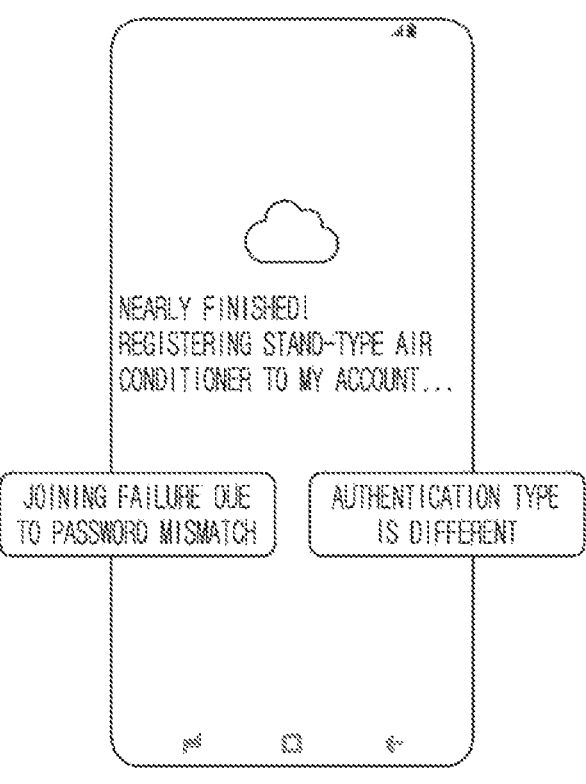

FIG. 9 to FIG. 11 are diagrams illustrating an operation of guiding a joining failure, according to an one or more embodiments.

First, the user terminal device 100 may perform, as shown in FIG. 9, the Easy Setup operation for joining the home appliance 200 such as an air conditioner to the access point 300.

However, the home appliance 200 may fail in the joining of the access point 300 for reasons of a mismatch of information about the access point 300, a weak signal intensity, power being off of the access point 300, and the like, and the home appliance 200 may transmit the joining failure information to the user terminal device 100 as shown in FIG. 10.

The user terminal device 100 may display, based on the joining failure information being received, a screen guiding of the joining failure. For example, the user terminal device 100 may display a screen guiding of the joining failure such as "joining failure due to password mismatch" or "authentication type is different," as shown in FIG. 11.

Figure 12:
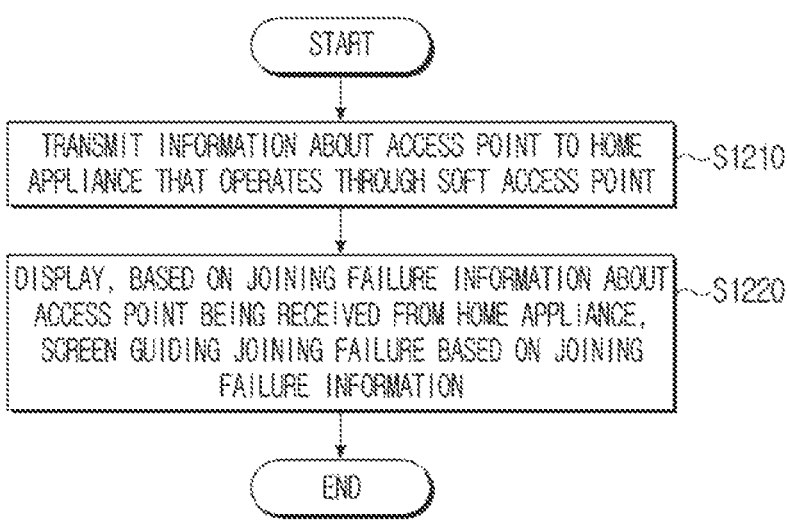
FIG. 12 is a flowchart illustrating a control method of a user terminal device, according to an embodiment.

FIG. 12 is a flowchart illustrating a control method of a user terminal device, according to an embodiment.

First, information about the access point may be transmitted to the home appliance that operates through the Soft access point (S1210). Then, based on the joining failure information about the access point being received from the home appliance, a screen guiding of the joining failure may be displayed based on the joining failure information (S1220).

The displaying (S1220) may include, based on the reason for joining failure being the pre-set information based on the joining failure information, displaying the UI for re-inputting the information about the access point.

Then, the pre-set information may include at least one from among the SSID, the Passphrase, or the encryption type.

The joining failure information may further include transmitting to the IoT server.

In addition, forming a communication channel according to the first communication standard with the home appliance may be further included, and the transmitting (S1210) may include transmitting information about the access point to the home appliance through the communication channel according to the first communication standard, and the displaying (S1220) may include scanning a signal according to the second communication standard when the communication channel according to the first communication standard is released, and displaying, based on the joining failure information according to the second communication standard being received from the home appliance, a screen guiding of the joining failure.

Forming a communication channel according to the pre-set communication standard with the home appliance may be further included, and the transmitting (S1210) may include transmitting information about the access point to the home appliance through the communication channel according to the pre-set communication standard, and the displaying (S1220) may include scanning a signal according to the pre-set communication standard when the communication channel according to the pre-set communication standard is released, rejoining the communication channel according to the pre-set communication standard with the home appliance when the signal according to the pre-set communication standard is scanned by the home appliance, and displaying a screen guiding of the joining failure.

The displaying (S1220) may include displaying, based on the joining failure information according to the pre-set communication standard being received from the home appliance after the communication channel according to the pre-set communication standard is rejoined with the home appliance, a screen guiding of the joining failure.

The joining failure information may include at least one from among the error code, the Wi-Fi MAC address, or the product serial number.

Figure 13:
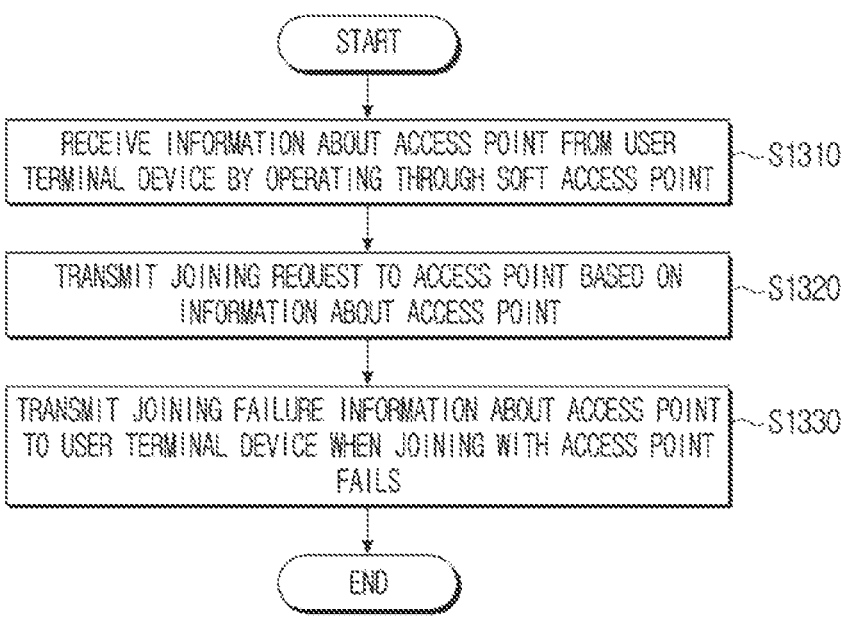
FIG. 13 is a flowchart illustrating a control method of a home appliance, according to an embodiment.

FIG. 13 is a flowchart illustrating a control method of a home appliance, according to an embodiment.

First, network information about the access point may be received from the user terminal device operating through the Soft access point (S1310). Then, the joining request may be transmitted to the access point based on the network information (S1320) Then, the joining failure information about the access point may be transmitted to the user terminal device when joining with the access point fails (S1330).

Forming a communication channel according to the first communication standard with the user terminal device may be further included, and the transmitting the joining request (S1320) may include releasing, based on information about the access point being received through the communication channel according to the first communication standard, the communication channel with the user terminal device and forming a communication channel according to the first communication standard with the access point, and the transmitting to the user terminal device (S1330) may include transmitting the joining failure information about the access point to the user terminal device according to the second communication standard if the communication channel with the access point is not formed.

Forming a communication channel according to the pre-set communication standard with the user terminal device may be further included, and the transmitting the joining request (S1320) may include releasing, based on information about the access point being received, the communication channel with the user terminal device and forming a communication channel according to the pre-set communication standard with the access point, and the transmitting to the user terminal device (S1330) may include maintaining the scannable state according to the pre-set communication standard if the communication channel with the access point is not formed.

The transmitting to the user terminal device (S1330) may include receiving the joining request from the user terminal device while maintaining the scannable state according to the pre-set communication standard, and transmitting, based on the communication channel according to the pre-set communication standard being reformed with the user terminal device, the joining failure information to the user terminal device.

According to the various embodiments of the disclosure as described above, the user terminal device may increase, based on the joining failure information about the access point being received from the home appliance in the Easy Setup process of the home appliance, user convenience by displaying a screen guiding of the joining failure.

In addition, the user terminal device may reduce, based on the reason for the joining failure being the pre-set reason, the Easy Setup time by displaying the UI for re-inputting information about the access point.

Further, the user terminal device may transmit the joining failure information to the IoT server, and the IoT server may analyze the reason for joining failure when the joining failure information is accumulated and automatically take action of the failure reason with a high frequency.

In addition, the home appliance may reduce, based on joining of the access point failing in the Easy Setup process, the waiting time for the rejoining by transmitting the joining failure information to the user terminal device.

The various embodiments described above may be implemented with software which includes instructions stored in a machine-readable storage medium (e.g., computer). The machine may call an instruction stored in the storage medium, and as a device operable according to the called instruction, may include an electronic device (e.g., electronic device (A)) according to the above-mentioned embodiments. Based on an instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored or being temporarily stored in the storage medium.

In addition, according to an embodiment, a method according to the various embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be stored at least temporarily in the storage medium such as a server of a manufacturer, a server of an application store, or a memory of a relay server, or temporarily generated.

In addition, the various embodiments described above may be implemented in a recordable medium which is readable by a computer or a device similar to the computer using software, hardware, or the combination of software and hardware. In some cases, embodiments described herein may be implemented by the processor on its own. According to a software implementation, embodiments such as the procedures and functions described herein may be implemented as separate software. Each software may perform one or more functions and operations described herein.

The computer instructions for performing processing operations in the device according to the various embodiments described above may be stored in a non-transitory computer-readable medium. The computer instructions stored in a non-transitory computer-readable medium may cause a specific device to perform a processing operation of the device according to the above-described various embodiments when executed by a processor of the specific device. The non-transitory computer-readable medium may refer to a medium that stores data semi-permanently rather than storing data for a very short time, such as a register, a cache, a memory, or the like, and is readable by a device. Examples of the non-transitory computer-readable medium may include, for example, and without limitation, a compact disc (CD), a digital versatile disc (DVD), a hard disc, a Blu-ray disc, a USB, a memory card, a ROM, and the like.

In addition, each element (e.g., a module or a program) according to the various embodiments described above may be formed of a single entity or a plurality of entities, and some sub-elements of the abovementioned sub-elements may be omitted or other sub-elements may be further included in the various embodiments. Alternatively or additionally, some elements (e.g., modules or programs) may be integrated into one entity and perform the same or similar functions performed by each of the corresponding elements prior to integration. Operations performed by a module, a program, or other element, in accordance with the various embodiments, may be executed sequentially, in parallel, repetitively, or in a heuristically manner, or at least some operations may be performed in a different order, omitted, or a different operation may be added.

While various embodiments of the disclosure have been illustrated and described, it will be understood that the various embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A user terminal device, comprising:
a communication interface comprising a first communication interface and a second communication interface;
a display;
memory storing instructions; and
at least one processor connected with the communication interface and the display,
wherein the instructions, when executed by the at least one processor individually or collectively, cause the user terminal device to:
control the first communication interface to provide, to a home appliance operating through a Soft access point, information about an access point, and
based on joining failure information about the access point being received through the second communication interface, control the display to display a screen guiding of a joining failure based on the joining failure information.

2. The user terminal device of claim 1, wherein the instructions, when executed by the at least one processor individually or collectively, cause the user terminal device to, based on a reason for the joining failure being pre-set information, control the display to display a user interface for re-inputting the information about the access point.

3. The user terminal device of claim 2, wherein the pre-set information comprises at least one from among a service set identifier (SSID), a passphrase, or an encryption type.

4. The user terminal device of claim 1, wherein the instructions, when executed by the at least one processor individually or collectively, cause the user terminal device to control the communication interface to provide the joining failure information to an Internet of Things server.

5. The user terminal device of claim 1,
wherein the instructions, when executed by the at least one processor individually or collectively, cause the user terminal device to:

control the first communication interface to form a communication channel according to a first communication standard with the home appliance, control the first communication interface to provide the information about the access point to the home appliance, control the second communication interface to scan a signal according to a second communication standard based on the communication channel according to the first communication standard being released, and based on the joining failure information being received from the home appliance through the second communication interface, control the display to display the screen guiding of the joining failure.

6. The user terminal device of claim 1, wherein the instructions, when executed by the at least one processor individually or collectively, cause the user terminal device further to:

control the communication interface to form a communication channel according to a pre-set communication standard with the home appliance, control the communication interface to provide information about the access point to the home appliance, control the communication interface to scan a signal according to the pre-set communication standard based on the communication channel according to the pre-set communication standard being released, control the communication interface to rejoin the communication channel according to the pre-set communication standard with the home appliance based on the signal according to the pre-set communication standard being scanned by the home appliance, and control the display to display the screen guiding of the joining failure.

7. The user terminal device of claim 6, wherein the at least one processor is further configured to, based on the joining failure information being received from the home appliance through the communication interface after rejoining the communication channel according to the pre-set communication standard with the home appliance, control the display to display the screen guiding of the joining failure.

8. The user terminal device of claim 1, wherein the joining failure information comprises at least one from among an error code, a Wi-Fi MAC address, or a product serial number.

9. A home appliance comprising:

memory storing instructions;

a communication interface comprising a first communication interface and a second communication interface; and at least one processor connected with the communication interface, wherein the instructions, when executed by the at least one processor individually or collectively, cause the home appliance to:

receive information about an access point from a user terminal device through the first communication interface operating through a Soft access point;

control the first communication interface to provide a joining request to the access point based on information about the access point, and control the second communication interface to provide joining failure information about the access point to the user terminal device based on a failing of a joining with the access point.

10. The home appliance of claim 9, wherein the instructions, when executed by the at least one processor individually or collectively, cause the home appliance to control the first communication interface to form a communication channel according to a first communication standard with the user terminal device, based on information about the access point being received through the first communication interface, release the communication channel with the user terminal device, and control the first communication interface to form the communication channel according to the first communication standard with the access point, and control the second communication interface to provide the joining failure information about the access point to the user terminal device based on the communication channel with the access point not being formed.

11. The home appliance of claim 9, wherein the instructions, when executed by the at least one processor individually or collectively, cause the home appliance to:

control the communication interface to form a communication channel according to a pre-set communication standard with the user terminal device, based on information about the access point being received through the communication interface, release the communication channel with the user terminal device, and control the communication interface to form the communication channel according to the pre-set communication standard with the access point, and maintain a scannable state according to the pre-set communication standard based on the communication channel with the access point not being formed.

12. The home appliance of claim 11, wherein the instructions, when executed by the at least one processor individually or collectively, cause the home appliance to:

receive a joining request from the user terminal device through the communication interface while maintaining the scannable state according to the pre-set communication standard, and based on the communication channel according to the pre-set communication standard being reformed with the user terminal device, control the communication interface to provide the joining failure information to the user terminal device.

13. A control method of a user terminal device, the control method comprising:

providing information about an access point to a home appliance operating through a Soft access point using a first communication interface included in the user terminal device; and based on joining failure information about the access point being received using a second communication interface included in the user terminal device from the home appliance, displaying a screen guiding of a joining failure based on the joining failure information.

14. The control method of claim 13, wherein the displaying comprises, based on a reason for the joining failure being pre-set information, displaying a user interface (UI) for re-inputting information about the access point.

15. The control method of claim 14, wherein the pre-set information comprises at least one from among a service set identifier (SSID), a passphrase, or an encryption type.

16. The control method of claim 13, further comprising:

providing the joining failure information to an Internet of Things server.

17. The control method of claim 13, further comprising:

forming a communication channel according to a first communication standard with the home appliance using the first communication interface, wherein the providing comprises providing the information about the access point to the home appliance using to the communication channel according to the first communication standard, wherein the displaying comprises:

based on the communication channel according to the first communication standard being released, scanning a signal according to a second communication standard of the second communication interface, and based on the joining failure information being received from the home appliance through the second communication interface, displaying the screen guiding of the joining failure.

18. The control method of claim 13, further comprising:

forming a communication channel according to a pre-set communication standard with the home appliance, wherein the providing comprises providing information about the access point to the home appliance, wherein the displaying comprises:

based on the communication channel according to the pre-set communication standard being released, scanning a signal according to the pre-set communication standard, based on the signal according to the pre-set communication standard being scanned by the home appliance, rejoining the communication channel according to the pre-set communication standard with the home appliance, and displaying the screen guiding of the joining failure.

19. The control method of claim 18, wherein the displaying comprises, based on the joining failure information being received from the home appliance through the communication interface after rejoining the communication channel according to the pre-set communication standard with the home appliance, displaying the screen guiding of the joining failure.

20. The control method of claim 13, wherein the joining failure information comprises at least one from among an error code, a Wi-Fi MAC address, or a product serial number.

* * * * *